3,112,310
10-ALKYLAMINOALKYLPHENOTHIAZINE-2-CARBOXAMIDES

John W. Cusic, Skokie, and Harman S. Lowrie, Northbrook, Ill., assignors to G. D. Searle & Co., Chicago, Ill., a corporation of Delaware
No Drawing. Filed Jan. 15, 1962, Ser. No. 166,403
1 Claim. (Cl. 260—243)

The present invention relates to a novel group of compounds which are derivative of phenothiazine-2-carboxamides. More particularly it relates to a group of compounds having the following general formula

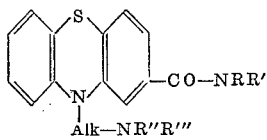

wherein —NRR' is selected from the group consisting of amino, hydrazino, (lower alkyl)amino, di(lower alkyl) amino, and cyclic amino; —NR"R'" is selected from the group consisting of di(lower alkyl)amino, cyclic amino, and methylpiperazino; Alk represents an alkylene radical. The lower alkyl radicals referred to above contain up to six carbon atoms and are exemplified by radicals such as methyl, ethyl, propyl, isopropyl, butyl, and hexyl.

The alkylene radicals contemplated by Alk are particularly lower alkylene radicals containing more than 1 carbon atom, for example, ethylene, trimethylene, 1,2-propylene, 2-methyl-1,3-propylene, and like bivalent saturated acyclic straight- or branched-chain hydrocarbon groups containing up to six carbon atoms.

The cyclic amino radicals which are included in —NRR' and —NR"R'" are derived from lower aliphatic cyclic amines by removal of the hydrogen from the nitrogen. Examples of such radicals are trimethylenimino, 1-pyrrolidinyl, piperidino, and hexamethylenimino.

Equivalent to the basic amines of this invention for the purposes here described are their nontoxic acid addition salts and quanternary ammonium salts. Such salts are formed with a variety of inorganic and organic acids, including sulfuric, phosphoric, hydrochloric, citric, maleic and related acids. Quaternary ammonium salts are formed with a variety of organic esters of sulfuric, hydrohalic, and aromatic sulfonic acids. Among such esters are methyl chloride and bromide, ethyl chloride, propyl chloride, dimethyl sulfate, methyl benzenesulfonate, ethylene chlorohydrin and allyl bromide.

The compounds of this invention are useful because of their valuable pharmacological properties. Thus, the present compounds show activity as depressants of the central nervous system and they also possess anti-hypertensive activity.

The compounds of the present invention can be prepared conveniently from lower alkyl esters of phenothiazine-2-carboxylic acid. The methyl ester of phenothiazine-2-carboxylic acid is preferred for this purpose. The ester in question can be reacted with phosgene to give the corresponding 10-chlorocarbonyl compound and this is reacted with an alcohol of the formula

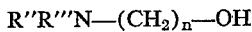

to give a phenothiazine ester having the following formula

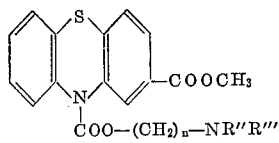

wherein $n$ and —NR"R'" are defined as above. When this 10-carboxylate of phenothiazine is heated to about 200° C. in the presence of a copper catalyst, decarboxylation takes place to give a compound of the formula

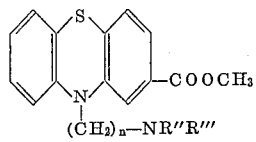

This 10-dialkylaminoalkyl-2-carbomethoxyphenothiazine can also be obtained by reacting the methyl ester of phenothiazine-2-carboxylic acid with sodium hydride in an inert solvent such as toluene to form the salt at the 10 position and then reacting the salt with a dialkylaminoalkyl halide of the formula

In the final step of the procedure, the 10-dialkylaminoalkyl-2-carbomethoxyphenothiazine is heated with an amine of the formula

where —NRR' is defined as above.

The compounds which constitute this invention and their preparation will appear more fully from a consideration of the following examples which are given for the purpose of illustration only and are not to be construed as limiting the invention in spirit or in scope. In these examples, quantities are indicated in parts by weight, temperatures in degrees centigrade (° C.), and pressures in millimeters of mercury (mm.), except as otherwise noted.

Example 1

To 100 parts of phosgen and 52.5 parts of methyl 2-phenothiazinecarboxylate in 1300 parts of toluene is added 36 parts of pyridine at 0–5° C. with stirring. The mixture is allowed to stand at 25° C. for 15 hours before it is diluted with ether and filtered. The solvent is evaporated from the filtrate under reduced pressure and the residue is dissolved in chloroform. The resultant chloroform solution is washed first with dilute hydrochloric acid and then with water before it is dried over anhydrous sodium sulfate and concentrated by boiling off solvent. Heptane is added to the hot chloroform solution and the resultant mixture is cooled to give yellow crystals of 2-carbomethoxy-10-chlorocarbonylphenothiazine melting at about 143–145° C.

Example 2

A butanone solution of 16 parts of 2-carbomethoxy-10-chlorocarbonylphenothiazine and 10.3 parts of 3-dimethylamino-1-propanol is refluxed for 15 hours. The resultant mixture is filtered and the solvent is evaporated from the filtrate under reduced pressure. The residual solid is combined with the solid that had been filtered off earlier and dissolved in chloroform and the chloroform solution is washed with dilute potassium hydroxide solution and water before it is dried and the solvent is evaporated.

The residual oil is dissolved in 100 parts m-dimethoxybenzene, 1 part of copper powder is added and the mixture is heated slowly to reflux. After refluxing for 3 hours the mixture is cooled, diluted with ether, and extracted with dilute hydrochloric acid. The acid extracts are washed once with ether and then made alkaline with dilute potassium hydroxide. The resultant alkaline solution is extracted with ether. The extract is dried and the solvent is evaporated to leave an oil which is crude 2 - carbomethoxy - 10 - (3 - dimethylaminopropyl)phenothiazine. This compound has the following formula

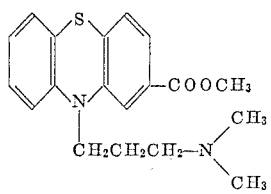

The 4 - carbomethoxy - 10 - (3-dimethylaminopropyl) phenothiazine obtained above is dissolved in 92 parts of methanol. The methanol solution is cooled in Dry Ice and 100 parts by volume of liquid ammonia is added; the resultant solution is heated in a sealed bomb at 125° C. for 24 hours. The bomb is cooled, the solution is removed and the solvent is evaporated. The resultant residue is extracted with 1.5 liters of a 30% solution (v./v.) of benzene in ethyl acetate. The organic extract is washed with dilute sodium hydroxide and water and then extracted with dilute hydrochloric acid. The acid extracts are washed with ether, alkalized with dilute potassium hydroxide solution and then extracted with ether. The resultant ether solution is dried and the solvent is evaporated. The residual oil is crystallized from a mixture of benzene and heptane to give 2-carbamyl-10 - (3 - dimethylaminopropyl)phenothiazine melting at 78–82° C. This compound has the following formula

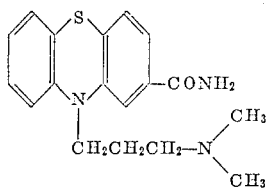

*Example 3*

An equivalent quantity of 3-diethylamino-1-propanol is substituted for the 3-dimethylamino-1-propanol and the procedure of Example 2 is repeated to give 2-carbamyl-10 - (3 - diethylaminopropyl)phenothiazine. This compound has the following formula

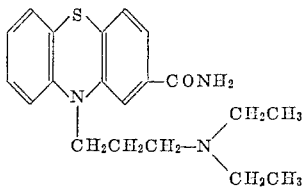

*Example 4*

If 35 parts of 2-carbomethoxy-10-chlorocarbonylphenothiazine is reacted with 18 parts of 1-methyl-4-(3-hydroxypropyl)piperazine in 1200 parts of butanone according to the procedure described in the first paragraph of Example 2, there is obtained 2-carbomethoxy-10-[3 - (4 - methyl-1 - piperazinyl)propoxycarbonyl]phenothiazine as a yellow oil. The resultant oil, 1 g. of copper powder and 500 ml. of o-dichlorobenzene is refluxed for 3 hours. The mixture is cooled, diluted with chloroform, and washed first with dilute potassium hydroxide solution and then with water. The organic solution is then extracted with dilute hydrochloric acid and the acidic extract is made alkaline and extracted with chloroform. The chloroform solution is dried and the solvent is evaporated to give 2-carbomethoxy-10-[3-(4-methyl-1-piperazinyl)propyl]phenothiazine as a brown oil.

A mixture of 9 parts of 2-carbomethoxy-10-[3-(4-methyl-1-piperazinyl)propyl]phenothiazine, 80 parts of methanol and 100 ml. of liquid ammonia is heated in a sealed tube at 100–150° C. for 15 hours. The resultant mixture is cooled, the solvent is evaporated and the residue is dissolved in chloroform. The chloroform solution is washed first with dilute potassium hydroxide solution and then with water. The solution is dried and the solvent is evaporated. The residue is dissolved in 240 parts of ethanol together with 4 parts maleic acid to give the bis-maleic acid salt of 2-carbamyl-10-[3-(4-methyl - 1 - piperazinyl)propyl]phenothiazine. After recrystallization from methanol this compound melts at about 152–154° C. The free base of this compound has the following formula

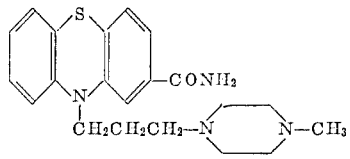

*Example 5*

A mixture of 15 parts of 2-carbomethoxy-10-[3-(4-methyl-1-piperazinyl)propyl]phenothiazine and 15 parts of hydrazine hydrate in 160 parts of ethanol is refluxed and concentrated slowly to a volume of 75 ml. The resultant mixture is allowed to stand for 15 hours before it is diluted with water and alkalized with dilute potassium hydroxide solution. The alkalized mixture is extracted with chloroform and the chloroform extract is washed with water before it is dried and the solvent is evaporated. A solution of 3.3 parts of this residual oil and 3 parts of maleic acid in 160 parts of ethanol gives, on cooling, the bis-maleic acid salt of 2-hydrazinocarbonyl - 10 - [3 - (4 - methyl-1-piperazinyl)propyl]phenothiazine melting at about 143–145° C. The free base of this compound has the following formula

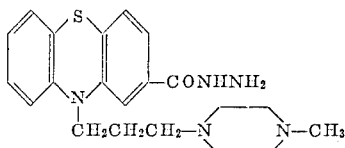

*Example 6*

A mixture of 25.2 parts of 2-carbomethoxyphenothiazine and 35 parts of sodium hydride in 870 parts of dry toluene is stirred and refluxed for 2 hours before 15 parts of 2-diethylaminoethyl chloride is added. The resultant mixture stirred and refluxed for 14 hours before it is cooled and decomposed by the addition of ethanol. The reaction mixture is further diluted with benzene and it is then washed with dilute potassium hydroxide solution and water before it is extracted with dilute hydrochloric acid. The acid extracts are washed once with ether, alkalized with dilute potassium hydroxide solution and extracted with benzene. Evaporation of the solvent from the dried benzene extracts gives 2-carbomethoxy-10-(2-diethylaminoethyl)phenothiazine as an oil.

A mixture of 7.4 parts of the crude 2-carbomethoxy-10-(2-diethylaminoethyl)phenothiazine, 20 parts of methylamine and 80 parts of methanol is heated in a sealed bomb at 100° C. for 12 hours. The solvent is evaporated from the cooled reaction mixture and the resultant residue is dissolved in ether, washed with dilute potassium hydroxide solution and then with water before it is extracted with dilute hydrochloric acid. The acidic extracts are washed once with ether and alkalized and the alkaline mixture is extracted with ether. The ether solution is dried and the solvent is evaporated to give 2-(N-methylcarbamyl) - 10 - (2 - diethylaminoethyl)phenothiazine as an oil. This compound has the following formula

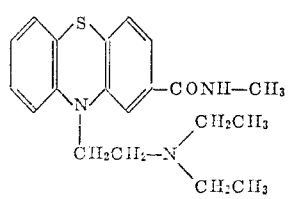

Example 7

Substitution of 12 parts of 2-dimethylaminoethyl chloride for the 15 parts of 2-diethylaminoethyl chloride called for in the first paragraph of Example 6 affords, by the procedure there described, 2-carbomethoxy-10-(2-dimethylaminoethyl)phenothiazine. The product thus obtained is reacted with 29 parts of ethylamine in a sealed bomb. The procedure used is the same as that described in the second paragraph of Example 6; the product obtained is 2 - (N - ethylcarbamyl) - 10-(2-dimethylaminoethyl)phenothiazine. It has the following formula

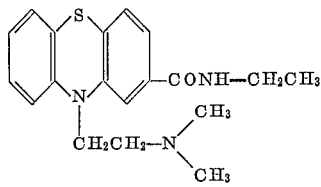

Example 8

A mixture of 82 parts of 2-carbomethoxy-10-chlorocarbonylphenothiazine, 15 parts of 3-piperidinopropanol and 20 parts of triethylamine in 350 parts of benzene is refluxed for 12 hours. The cooled reaction mixture is filtered and the filtrate is washed with dilute potassium hydroxide solution and water and then extracted with dilute hydrochloric acid. The acidic extracts are washed once with ether before they are alkalized and extracted with benzene. The benzene solution is dried and the solvent is evaporated to leave an oil which is crude 2-carbomethoxy - 10 - (3 - piperidinopropoxycarbonyl)phenothiazine.

A solution of the oil in 300 parts by volume of o-dichlorobenzene together with 1 part of copper powder is refluxed for 4 hours. The cooled solution is diluted with benzene and then washed first with dilute potassium hydroxide solution and then with water. The alkaline mixture is extracted with dilute hydrochloric acid and the acid extracts are washed once with ether before they are made alkaline with dilute potassium hydroxide solution. Extraction of the alkaline solution with benzene is followed by drying of the benzene solution and evaporation of the solvent to yield oily 2-carbomethoxy-10-(3-piperidinopropyl)phenothiazine.

A mixture of 13 parts of 2-carbomethoxy-10-(3-piperidinopropyl)phenothiazine, 0.1 part of sodium methoxide and 96 parts of pyrrolidine is heated in a sealed bomb at 200° C. for 12 hours. The cooled reaction mixture is diluted with benzene and washed first with dilute potassium hydroxide solution and then with water before it is extracted with dilute hydrochloric acid. The combined acid extracts are washed once with water and then made alkaline with dilute potassium hydroxide. Ether is used to extract the alkaline mixture and the resultant ether solution is dried and the solvent is evaporated to give an oil which is 2-(1-pyrrolidinyl)carbonyl-10-(3-piperidinopropyl)phenothiazine. This compound has the following formula

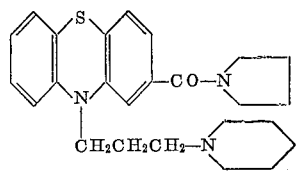

Example 9

A mixture of 13.5 parts of 2-carbomethoxy-10-(3-piperidinopropyl)phenothiazine, 22 parts of methylamine and 80 parts of methanol is heated in a bomb at 100° C. for 12 hours. The procedure used for isolation of the product from the reaction mixture is the same as that described in the last paragraph of Example 8. The product, obtained as an oil, is 2-(N-methylcarbamyl)-10-(3-piperidinopropyl)phenothiazine. This compound has the following formula

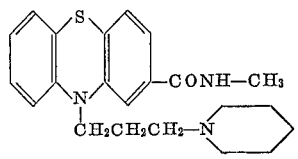

Example 10

A mixture of 11.6 parts of 2-carbomethoxy-10-(3-dimethylaminopropyl)phenothiazine, 70 parts of diethylamine and 120 parts of methanol is heated in a sealed bomb at 100° C. for 12 hours. The cooled reaction mixture is diluted with benzene and washed first with dilute potassium hydroxide solution and then with water before it is extracted with dilute hydrochloric acid. The combined acid extracts are washed once with water and then alkalized with dilute potassium hydroxide solution. The resultant mixture is extracted with ether. Evaporation of the solvent from the dried ether solution gives 2-(N,N-diethylcarbamyl)-10-(3 - dimethylaminopropyl)phenothiazine.

If 12.6 parts of 2-carbomethoxy-10-(3-diethylaminopropyl)phenothiazine is reacted with 63 parts of dimethylamine in 130 parts of methanol according to the procedure described above, the product is 2-(N,N-dimethylcarbamyl) - 10 - (3 - diethylaminopropyl)phenothiazine. This compound has the following formula

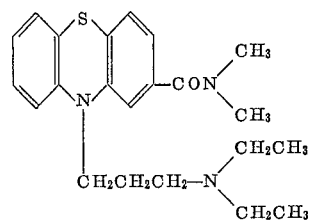

What is claimed is:

2-hydrazinocarbonyl-10-[3-(4-methyl - 1 - piperazinyl) propyl] phenothiazine.

References Cited in the file of this patent

UNITED STATES PATENTS

| | | |
|---|---|---|
| 2,956,996 | Craig | Oct. 18, 1960 |
| 2,957,870 | Cusic et al. | Oct. 25, 1960 |

FOREIGN PATENTS

| | | |
|---|---|---|
| 203,503 | Austria | May 25, 1959 |
| 821,012 | Great Britain | Sept. 30, 1959 |

OTHER REFERENCES

Cauquil et al.: Bull. Soc. Chim., France, 1955, page 776.